US005344353A

United States Patent [19]

Jang et al.

[11] Patent Number: 5,344,353

[45] Date of Patent: Sep. 6, 1994

[54] METHOD FOR MANUFACTURING A CATHODE RAY TUBE USING A FILM LAYER COMPOSITION

[75] Inventors: Dong-sik Jang, Kwacheon; Byeong-yong Lee, Seoul, both of Rep. of Korea

[73] Assignee: Samsung Electron Devices Co., Ltd., Kyunggi, Rep. of Korea

[21] Appl. No.: 786,769

[22] Filed: Nov. 1, 1991

[30] Foreign Application Priority Data

Nov. 1, 1990 [KR] Rep. of Korea .................... 90-17702
Oct. 25, 1991 [KR] Rep. of Korea .................... 91-18772

[51] Int. Cl.[5] ........................... C08J 3/28; C08K 3/18

[52] U.S. Cl. ......................................... 445/45; 522/10; 522/33; 522/96; 522/173; 522/13; 522/79; 427/64

[58] Field of Search ................... 522/10, 96, 8, 33, 13, 522/173, 182; 445/45; 427/64

[56] References Cited

U.S. PATENT DOCUMENTS 3,821,009 6/1974 Lerner et al. ...................... 117/33.5
4,609,612 9/1986 Berner et al. ......................... 522/10
4,837,126 6/1989 Lin ........................................ 522/93

*Primary Examiner*—Susan Berman
*Attorney, Agent, or Firm*—Leydig, Voit & Mayer

[57] ABSTRACT

A method for manufacturing a cathode ray tube is provided which comprises (a) spraying on the inner surface of a phosphor layer of a phosphor coated panel, an organic composition for forming a heat labile film, the organic composition being free of flammable or explosive organic solvents and including an initiator capable of forming a radical or cation when exposed to ultraviolet or electron rays and at least one resin containing at least one group consisting of acrylate, vinyl and diazo functional groups to form a heat labile film thereon; (b) exposing the heat labile film to ultraviolet or electron rays to from a hardened film layer; (c) forming an aluminum layer on a surface of the hardened film layer to form a screen; (d) sealing with heat the panel and a funnel to form a bulb with a mount including an electron gun and a stem, wherein the step of sealing to form a bulb decomposes the hardened film layer.

12 Claims, 1 Drawing Sheet

METHOD FOR MANUFACTURING A CATHODE RAY TUBE USING A FILM LAYER COMPOSITION

BACKGROUND OF THE INVENTION

The present invention relates to a composition for manufacturing a filming or film layer which is interposed between a phosphor layer and an aluminum layer when manufacturing a screen for a cathode ray tube, and to a method for manufacturing a cathode ray tube using the same.

Generally, there is provided a phosphor layer and an aluminum deposited layer on the inner surface of a panel of a cathode ray tube to form a screen.

The phosphor layer emits light when stimulated by an electron beam radiated from an electron gun. The emitted light is a scattered light and radiates to all directions including forward and backward of the panel glass. And this largely lowers the emission luminance at the front of the panel where the image is reproduced, when compared with that expected from the actually emitted light intensity from the phosphor.

To solve the above mentioned problem, a deposited metal layer is formed over the phosphor layer with a certain gap. The deposited metal layer reflects the light radiated backward from the panel to the front side, and this enhances the luminance of the image.

Most of the deposited metal layer is an aluminum deposited layer which is formed by a vacuum deposition method employing aluminum of which specific gravity is small, and so the thus formed aluminum layer can transmit electrons having high-energy with little energy loss.

The phosphor layer formed on the inner surface of the panel has an uneven surface because of the irregularity of the phosphor particle size. Accordingly, if the aluminum is deposited on the surface of the phosphor layer, an aluminum deposited layer having an uneven surface would be formed and the ratio of regular reflection of the light emitted from the phosphor would be decreased.

In order to increase the reflection effect, an even aluminum layer should be formed over the phosphor layer with a certain gap. To manufacture such an aluminum layer, an organic composition which decomposes at about 450° C., is coated on the surface of the phosphor layer to make an evenly coated layer. On the surface of the coating layer, aluminum is deposited and then the coating layer is decomposed by thermolysis at about 450° C. The above mentioned intermediate coating layer is called a filming or film layer.

FIG. 1 is a schematic cross sectional view of a screen before baking. On the surface of a panel 1, a phosphor layer 2 having an uneven surface is formed. And, on the surface of the phosphor layer 2, an organic filming layer 3 having a comparatively even surface is formed. The layer on the surface of the filming layer is an aluminum deposited layer 4 and ammonium oxalate 5 having needle shaped structure is protrusively embeded in the aluminum deposited layer.

The filming layer is manufactured by the two common methods described below.

First, a spin coating method using an acryl emulsion is well known as disclosed in Japanese Patent publication No. 57-18815. The spin coating method proceeds by spin coating an acryl emulsion homogeneously on the surface of the phosphor layer formed on the inner surface of the panel and decomposing the acryl emulsion particles during a drying process to obtain an even coating layer through bonding between the acryl monomers produced by the decomposition. According to this filming layer manufacturing a large amount of energy is consumed for the drying process. If the drying condition is inadequate, the acryl emulsion particles do not decompose and an evenly coated layer can not be produced, which deteriorates emission luminance. Moreover, if the filming layer is too thin, subsequently deposited aluminum permeates the phosphor layer and deteriorates emission luminance, and if the layer is too thick, the aluminum layer peels off. Therefore, additional attention to controlling the thickness of the layer is needed.

U.S. Pat. No. 3,821,009 discloses a lacquer spray method. The lacquer spray method proceeds by dissolving acrylic organic materials in hydrophobic solvent such as methyl ethyl ketone, xylene and toluene to obtain lacquer. The lacquer is sprayed on the wetted phosphor layer to make an even organic layer, forming an interface with water contained in the phosphor layer. By this method, a layer smoother than that obtained by the acryl emulsion coating method is obtained and the emission luminance of the cathode ray tube is enhanced. Because there's no drying process in this method, a large amount of energy is saved. However, the organic solvents such as xylene and toluene are explosive and flammable, so a separately enclosed space and powerful ventilator are needed. Accordingly, great expense for establishing the installation is required.

SUMMARY OF THE INVENTION

An object of the present invention is to provide a filming layer composition void of problems of explosion and fire solving the above mentioned problems, while providing good adherence and rapid hardening and drying characteristics.

Another object of the present invention is to provide a filming layer composition which improves emission luminance of a cathode ray tube by enhancing evenness of an aluminum layer constituting a part of a screen.

A further object of the present invention is to provide a method for manufacturing a cathode ray tube, which is simple and results in savings in manufacturing cost and time by employing the above mentioned filming layer composition.

To accomplish one object of the present invention, there is provided a composition for forming a filming layer interposed between a phosphor layer and an aluminum layer when manufacturing a screen for a cathode ray tube, the composition comprising: resins containing at least one functional group selected from the group consisting of acrylate, vinyl and diazo functional groups; and an initiator of 0.1 to 10 weight percent which can easily produce a radical or cation when exposed to ultraviolet or electron rays.

To accomplish another object of the present invention, there is provided a method for manufacturing a cathode ray tube comprising the steps of: spraying a filming layer composition containing organic materials on the inner surface of a panel onto the surface of a phosphor layer, drying said composition to form a filming layer and forming an aluminum layer on the surface of the filming layer; decomposing organic materials of said filming layer to form a screen on said inner surface of the panel; and sealing a bulb including the resultant panel and a funnel with a mount including an electron gun and a stem, wherein said filming layer composition essentially comprises resins for forming a layer, an initiator and 2% ammonium oxalate, and said organic materials of said heat labile filming layer are decomposed through said sealing process of said bulb and mount.

DETAILED DESCRIPTION OF THE INVENTION

Figure 1:
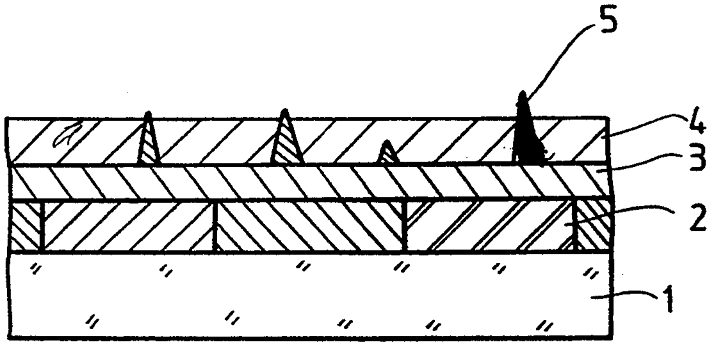
FIG. 1 is a schematic cross sectional view of a screen before baking.

In the present invention, after spraying a filming layer composition obtained by mixing resins containing at least one functional group selected from the group consisting of acrylate, vinyl and diazo functional groups, with a small quantity of initiator which can easily produce a radical or cation when exposed to ultraviolet or electron rays on the surface of the phosphor layer, the filming layer composition is exposed to ultraviolet or electron rays to produce a radical or cation from the initiator. The produced radical or cation reacts with the functional groups in the resin, that is, radical or cation polymerization, and so the filming layer composition hardens and dries rapidly.

The initiator is at least one selected from the group consisting of benzil, benzoyl compounds, benzoin alkyl esters, benzil methyl acetal, benzil methyl ketal, benzophenone, benzoin group containing compounds and acetophenone-group containing compounds, which all can easily produce radicals or cations when exposed to ultraviolet or election rays.

And the filming layer composition preferably further comprises a photo accelerator. The photo accelerator is at least one selected from the group consisting of urea compounds, aliphatic amines, aromatic amines, N,N-disubstituted-aminobenzonitriles and aromatic sulfonates.

The present invention will be described in detail with the following examples.

EXAMPLE 1

59 weight percent of trimethylol propane triacrylate, 30 weight percent of urethane acrylate and 10 weight perent of N-methyl acrylamide monomer are mixed. 1 weight percent of 1-benzoylcyclohexanol and a small quantity of ammonium oxalate crystals having a needle shaped structure are added to the mixture to obtain a filming layer composition. After coating the thus obtained filming layer composition on the inner surface of the panel on which the phosphor layer is formed by a spin coating method, the composition is exposed to ultraviolet rays (365 nm) radiated from a mercury lamp with ultrahigh voltage. After about 3 minutes, all the resin components in the filming layer composition harden and dry to give an opaque filming layer. Aluminum is vacuum deposited on the surface of the filming layer to give an aluminum layer, thereby completing the screen. Then the panel with completed screen is sealed with a funnel to give a bulb. The thus obtained bulb is sealed with a mount comprising an electron gun and a stem. The sealing proceeds at about 400° C. during which the organic materials in the filming layer decompose and are removed. Thereafter a cathode ray tube is completed according to the known method.

EXAMPLE 2

50 weight percent of 1,6-hexanediol diacrylate, 30 weight percent of urethane acrylate, 10 weight percent of 2-hydroxyethyl acrylate, 5 weight percent of benzophenone and 5 weight percent of 1-benzoylcyclohexanol are mixed. A small quantity (2%) of ammonium oxalate is added to the mixture to obtain a filming layer composition. After coating the thus obtained filming layer composition on the inner surface of the panel on which the phosphor layer is formed, the composition is exposed to ultraviolet rays of 365 nm wavelength. After about 50 seconds, the composition hardens and dries to give a clear filming layer. Then according to the method as described in Example 1, a cathode ray tube is obtained.

EXAMPLE 3

45 weight percent of trimethylol propane triacrylate, 20 weight percent of 1,6-hexanediol diacrylate, 18 weight percent of urethane acrylate, 12 weight percent of 2-hydroxy propyl methacrylate, 3 weight percent of benzophenone and 2 weight percent of 1-benzoylcyclohexanol are mixed. A small quantity of aminoacrylate as a photo accelerator and a small quantity of (2%) ammonium oxalate crystals having a needle shaped structure are added to the mixture to obtain a filming layer composition. After coating the thus obtained filming layer composition on the inner side of the panel on which the phosphor layer is formed, the composition is exposed to ultraviolet rays of 365 nm wavelength. After about 20 seconds, the filming layer composition hardens and dries to give a clear filming layer. Subsequently, according to the method as described in Example 1, a cathode ray tube of the present invention is obtained.

According to the method for manufacturing a cathode ray tube using the filming layer composition of the present invention as described above, the following effects are obtained.

(1) Because a drying and baking process after coating the filming layer composition are no longer needed, a large amount of energy is saved.

(2) Because the filming layer composition hardens rapidly, the time needed for manufacturing the whole cathode ray tube is shortened and the work efficiency is enhanced.

(3) Since no explosive organic solvents are employed, a ventilator is not needed, there's no problem of indoors contamination and the work environment is safe.

(4) Since the filming layer composition hardens through the radical or cation polymerization reaction, bridge-bonding between resins are smoothly obtained which results in a far more even filming layer and make the aluminum layer also even to enhance the luminance of the cathode ray tube.

The method for manufacturing a cathode ray tube, using the filming layer composition of the present invention, by means of the hardening method employing ultraviolet or electron rays is a novel one which is simple, safe and very practical.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for manufacturing a cathode ray tube comprising the steps of:

(a) spraying on the surface of a phosphor layer of a phosphor coated panel, an organic composition for forming a heat labile film, said organic composition being free of flammable or explosive organic solvents and including an initiator capable of forming a radical or cation when exposed to ultraviolet or electron rays and at least one resin containing at least one functional group selected from the group consisting of acrylate, vinyl and diazo functional groups to form a heat labile film thereon;

(b) exposing said heat labile film to ultraviolet or electron rays to form a hardened film layer;

(c) forming an aluminum layer on a surface of said hardened film layer to form a screen;

(d) sealing with heat said panel and a funnel to form a bulb with a mount including an electron gun and a stem, wherein the step of sealing to form a bulb decomposes said hardened film layer.

2. A method for manufacturing a cathode ray tube as claimed in claim 1, wherein said resin is an acrylate including trimethylol propane triacrylate, 1,6-hexanediol diacrylate and urethane acrylate.

3. A method for manufacturing a cathode ray tube as claimed in claim 1, wherein said initiator is at least one compound selected from the group consisting of benzil, benzoyl compounds, benzoin alkyl ester, benzil methyl acetal, benzil methyl ketal, benzophenone, benzoin and acetophenone group-containing compounds.

4. A method for manufacturing a cathode ray tube as claimed in claim 3, wherein said initiator is at least one selected from the group consisting of benzophenone and 1-benzoylcyclohexanol.

5. A method for manufacturing a cathode ray tube as claimed in claim 1 wherein the amount of said initiator ranges from 0.1 to 10 weight percent based on the composition for forming a film layer.

6. A method for manufacturing a cathode ray tube as claimed in claim 1, wherein said filming layer composition further comprises a photo accelerator.

7. A method for manufacturing a cathode ray tube as claimed in claim 17, wherein said photo accelerator is at least one selected from the group consisting of urea compounds, aliphatic amines, aromatic amines, N,N-disubstituted-p-amino benzonitriles and aromatic sulfonates.

8. A method for manufacturing a cathode ray tube as claimed in claim 7, wherein said photo accelerator is aminoacrylate.

9. A method for manufacturing a cathode ray tube as claimed in claim 1, wherein said filming layer composition consists essentially of 59 weight percent of trimethylol propane triacrylate, 30 weight percent of urethane acrylate, 10 weight percent of N-methyl acrylamide monomer and 1 weight percent of 1-benzoylcyclohexanol.

10. A method for manufacturing a cathode ray tube as claimed in claim 1, wherein said filming layer composition consists essentially of 50 weight percent of 1,6-hexanediol diacrylate, 30 weight percent of urethane acrylate, 10 weight percent of 2-hydroxyethyl acrylate, 5 weight percent of benzophenone and 5 weight percent of 1-benzoylcyclohexanol.

11. A method for manufacturing a cathode ray tube as claimed in claim 1, wherein said filming layer composition consists essentially of 45 weight percent of trimethylol propane triacrylate, 20 weight percent of 1,6-hexanediol diacrylate, 18 weight percent of urethane acrylate, 12 weight percent of 2-hydroxy propyl methacrylate, 3 weight percent of benzophenone, 2 weight percent of 1-benzoylcyclohexanol and a trace of aminoacrylate.

12. A method for manufacturing a cathode ray tube according to claim 1 wherein said composition further includes crystals of ammonium oxalate.

* * * * *

UNITED STATES PATENT AND TRADEMARK OFFICE

CERTIFICATE OF CORRECTION

PATENT NO. : 5,344,353

DATED : September 6, 1994

INVENTOR(S) : JANG et al.

It is certified that error appears in the above-indentified patent and that said Letters Patent is hereby corrected as shown below:

Column 5, line 37, after "1" insert --,--;

Column 6, line 5, change "17" to --6--.

Signed and Sealed this

Twentieth Day of December, 1994

Attest:

Bruce Lehman

BRUCE LEHMAN

*Attesting Officer* *Commissioner of Patents and Trademarks*